Patented Feb. 16, 1932

1,845,563

UNITED STATES PATENT OFFICE

OTTO SCHMIDT AND KARL SEYDEL, OF LUDWIGSHAFEN-ON-THE-RHINE, AND EGON MEYER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF AMINES OF THE HYDROAROMATIC-ALIPHATIC SERIES

No Drawing. Application filed September 12, 1927, Serial No. 219,173, and in Germany August 27, 1926.

We have found that amines containing both cycloaliphatic and aliphatic radicles and at least in the aliphatic radical a hydroxyl group, or their derivatives in said radicles, or one of them, may be obtained by linking together cycloaliphatic radicles with aliphatic radicles, which latter at least contains a hydroxyl group in a free state or in a form which can readily be converted into a free hydroxyl group, by nitrogen or nitrogen-hydrogen groups, with the assistance of reactive atoms or groups. These reactive atoms or groups may be for example halogen atoms, hydroxyl, alkylene oxid, ester, aldehyde or ketone groups. If compounds containing aldehyde or ketone groups be employed, simultaneous or subsequent reduction becomes necessary.

Thus, for example, cyclohexylethanolamine may be obtained by the action of glycolchlorhydrin or ethylene oxid on cyclohexylamine, or by the action of cyclohexanone on ethanolamine, and simultaneous or subsequent catalytic reduction with hydrogen and nickel. Substances of the kind herein mentioned may also be obtained according to the present invention by the action of hydroxyaldehydes and hydroxyketones, such as aldol or sugars, on cycloaliphatic amines, followed by hydrogenation. In a similar manner tetrahydrobenzene oxid may be condensed with aliphatic amines containing at least a free hydroxyl group or an equivalent thereof as mentioned above to valuable compounds of the same kind.

The substances produced as herein described possess the valuable property of destroying insects and such organisms as cause fermentation and putrefaction such as germs and fungi. They may be used for destroying pests, as preservative agents as, for example, for proteids and the like. Their acidyl compounds may be used for a great variety of purposes, for example, as softening agents, camphor substitutes and the like.

The following examples will further illustrate the nature of the said invention which however is not limited thereto. The parts are by weight.

Example 1

520 parts of gaseous impure ethylene oxid containing 85 per cent of pure ethylene oxid are introduced into 1030 parts of cyclohexylamine dissolved in about 3000 parts of water, the mixture being cooled with ice. After standing until the whole of the ethylene oxid has been converted, the water and unaltered cyclohexylamine are distilled off. The residue is distilled in vacuo, the cyclohexylethanolamine passing over at from about 123° C. to 127° C. under a pressure of 14 mm. of mercury. On cooling the product sets to a crystalline mass, melting at about 50° C. It is soluble in most solvents, and has a strongly basic reaction. Diethanol-cyclohexylamine, which boils at about 180 to 184° C. under a pressure of 14 mm. of mercury is also formed by the reaction.

The yield of the said two compounds is approximately theoretical. The said cyclohexyl ethanolamine corresponds to the formula

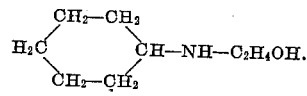

Example 2

98 parts of cyclohexanone and an alcoholic solution of 61 parts of ethanolamine, in the presence of finely divided nickel and hydrogen, are stirred in an autoclave provided with stirring mechanism at a temperature of from 130° to 140° C. and under a pressure of about 35 atmospheres, until the absorption of hydrogen has ceased. After cooling, the nickel powder is separated by filtration and the alcoholic solution, which chiefly contains cyclohexylethanolamine, is distilled to expel the alcohol and is then treated as in Example 1.

The procedure is similar when homologues of the above substances, such as methylcyclohexanone, propanol amine, butanolamine and the like are employed.

*Example 3*

198 parts of cyclohexylamine are mixed with 160 parts of glycolchlorhydrin and gently heated, care being taken to prevent the reaction, which quickly sets in with considerable disengagement of heat, from becoming too violent. After standing a short time, a sufficient quantity of strong caustic soda solution to set free the base is added, and washing of the product with a saturated solution of common salt follows. On distillation in vacuo, a good yield of cyclohexylethanol-amine passes over at from 129° to 133° C. under a pressure of 18 mm. of mercury.

We claim:

1. The process of producing cyclohexyl-ethanol-amine which comprises acting on cyclohexylamine with ethylene oxid.

2. As a new article of manufacture, cyclo-hexyl-ethanol amine.

3. The process of producing amines of the cycloaliphatic-aliphatic series which comprises acting an a cyclohexyl amine with an alkylene oxide.

4. As new articles of manufacture mono-cyclohexyl amines in which the amino group is substituted with at least one alkylol radicle.

In testimony whereof we have hereunto set our hands.

OTTO SCHMIDT.
KARL SEYDEL.
EGON MEYER.